United States Patent [19]

Sakai

[11] Patent Number: 5,005,026

[45] Date of Patent: Apr. 2, 1991

[54] THERMAL HEAD SEPARATING MECHANISMS

[75] Inventor: Katsuyuki Sakai, Yamatokoriyama, Japan

[73] Assignee: Sharp Kabushiki Kaisha, Osaka, Japan

[21] Appl. No.: 493,002

[22] Filed: Mar. 13, 1990

[30] Foreign Application Priority Data

Mar. 17, 1989 [JP] Japan .................................... 1-66965

[51] Int. Cl.$^{5}$ ............................................. G01D 15/10

[52] U.S. Cl. ................................ 346/76 PH; 400/120

[58] Field of Search ..................... 346/76 PH; 400/120

[56] References Cited

U.S. PATENT DOCUMENTS 4,507,666 3/1985 Kondo et al. ....................... 400/120

4,611,218 9/1986 Watanabe ............................ 400/120

4,625,218 11/1986 Watanabe ............................ 400/120

FOREIGN PATENT DOCUMENTS 59-176075 10/1984 Japan .

*Primary Examiner*—Mark J. Reinhart

*Assistant Examiner*—Huan Tran

[57] ABSTRACT

A thermal recording apparatus includes a roller for transferring thermosensitive recording paper, a thermal head including heating resistance elements, and a flat spring for biasing the thermal head to press against the thermosensitive recording paper on the roller. A cam is further provided in the thermal head, including a cam face along with contact members for keeping the thermal head at a distance from thermosensitive recording paper, and pushing the roller against the biasing force of the flat spring, under the condition where the heating resistance element of the thermal head is positioned on the line including the shaft of the roller and the contact point with the cam face.

19 Claims, 6 Drawing Sheets

F I G. 4 (1)
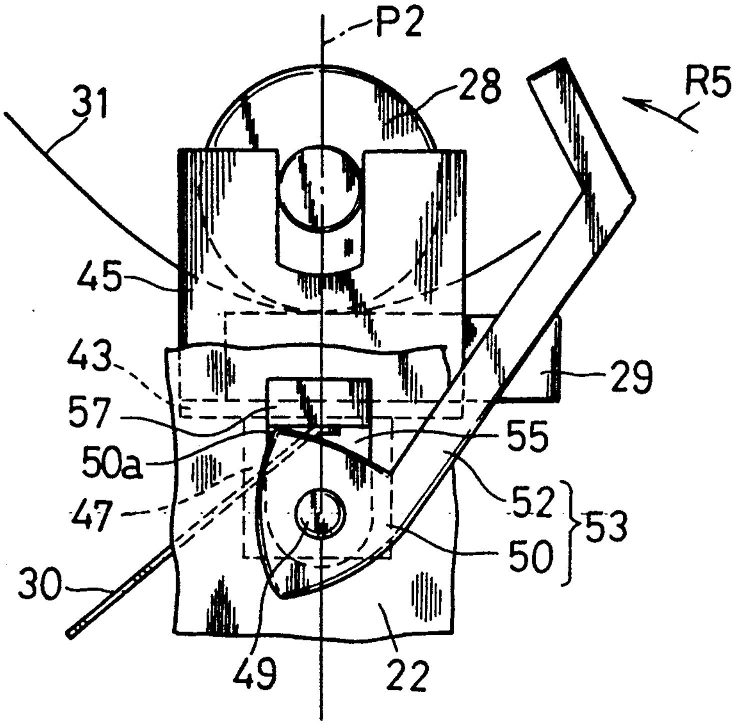
F I G. 4 (2)
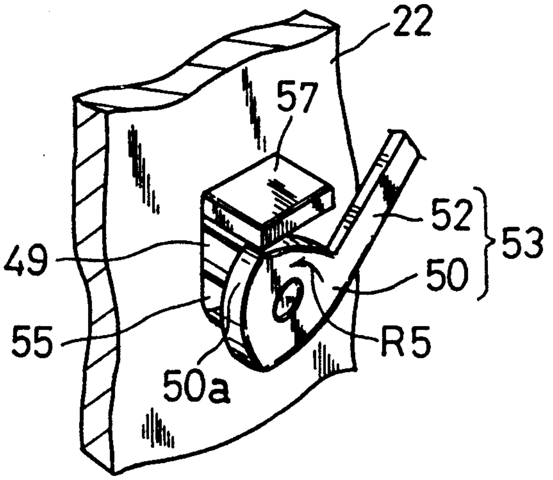

THERMAL HEAD SEPARATING MECHANISMS

BACKGROUND OF THE INVENTION (1) Field of the Invention

The present invention relates to a thermal recording apparatus, and more specifically, to a thermal recording apparatus of a facsimile device.

(2) Description of the Prior Art

FIG. 6 is a side view showing a major portion of the basic structure of a thermal record apparatus termed "thermal printer" or the like. Usually, in a thermal printer, a thermal head 1 is tightly pressed against a thermosensitive paper 3 on a roller 2 to prevent an irregularity in printing density. The thermal head 1 is fixed to a receiving portion 5 of a supporter 4, and a pushing device 6 such as a spring urges the thermosensitive paper 3 against the roller 2. At this time, vertical portions 8 of the supporter 4 hold a rotation shaft 9 of the roller 2 therebetween to keep the thermal head 1 in position. The thermal head 1 is composed of a plurality of heating resistance elements 7 disposed in parallel to the line of the rotation axis of the roller 2. The pushing device 6 applies force at the point on a plane P1 including the line corresponding to the rotation axis 9 and the heating resistance elements 7. The roller 2 has a shape of a right circular cylinder, and is driven by a driving mechanism (not shown) such as a stepping motor, operating synchronously with the recording operation of the thermal head 1. This causes the thermosensitive recording paper 3 to move in a direction shown by an arrow A2.

With the above-mentioned thermal printer, when the thermal head 1 must be kept off the roller 2 to supply further thermosensitive recording paper or to get rid of a paper jam, the operator manipulates an operating portion 10 so that a projection 11, formed in the operating portion 10, displaces the thermal head 1 against the force applied by the pushing device 6. As an example of the prior art embodiments, Unexamined Japanese Patent Publication No. 176075/1984 discloses an apparatus in which an operating portion is not separate from a supporter of a thermal head. In the thermal printer shown in FIG. 6, the projection 11 applies force to the thermal head 1 at a point which is not on the plane P1. Thus the thermal head 1 may sometimes be distorted in keeping the thermal head 1 off the roller 2. Such a distorted thermal head 1 would not be uniformly pressed against the roller 2, that is, the heating resistance elements 7 is ununiformly pressed on the thermosensitive recording paper 3. This causes irregularity in density of printed characters. There also arises a problem in that a larger operating force is required because the projection 11 applies the force to the thermal head 1 at the point which does not exist on the plane P1.

An object of the present invention is to solve the above-mentioned problems and to provide a thermal recording apparatus with improved operability and enhanced printing quality.

SUMMARY OF THE INVENTION

A thermal recording apparatus according to the present invention includes a body, a roller rotatably held in the body, for transferring thermosensitive paper, and recording a thermal head held in the body, capable of moving in the radial direction of the roller and including a heating resistance element. Thermosensitive recording paper then intervenes between the heating resistance element and the roller. A pushing device is further included for biasing the thermal head to press the thermosensitive recording paper against the roller. A cam is further provided in the thermal head for angularly displacing the thermal head and including a cam face. Contact members are provided in the body, coming in contact with the cam face by the angular displacing operation of the cam for keeping the thermal head at a distance from the thermosensitive recording paper. Further, the biasing roller is kept against the force of the pushing device, under the condition where the heating resistance element of the thermal head is positioned on the line including the shaft of the roller and the contact point with the cam face.

In accordance with the present invention, a cam is angularly displaced in relation to the thermal. A contact member then comes in contact with the cam face of the cam. They are provided to position the heating resistance element of the thermal head on a straight line including the axial line of the roller and the contact point of the cam face with the contact member. Thus, since the force is applied to the thermal head at a point along this straight line, distortion of the thermal head is prevented. Thus, the thermal head can uniformly press on the roller in recording. This considerably improves the printing quality of this thermal recording apparatus. Additionally, the force required for keeping the thermal head off the roller is prevented from Thus the operability is improved.

BRIEF DESCRIPTION OF THE DRAWINGS

FIG. 4(1) is a side view showing a major portion of the facsimile 21 under the recording condition;

FIG. 4(2) is a perspective view of FIG. 4(1);

FIG. 5(2) is a side view of FIG. 5(1); and

DETAILED DESCRIPTION OF THE PREFERRED EMBODIMENTS

Figure 1:
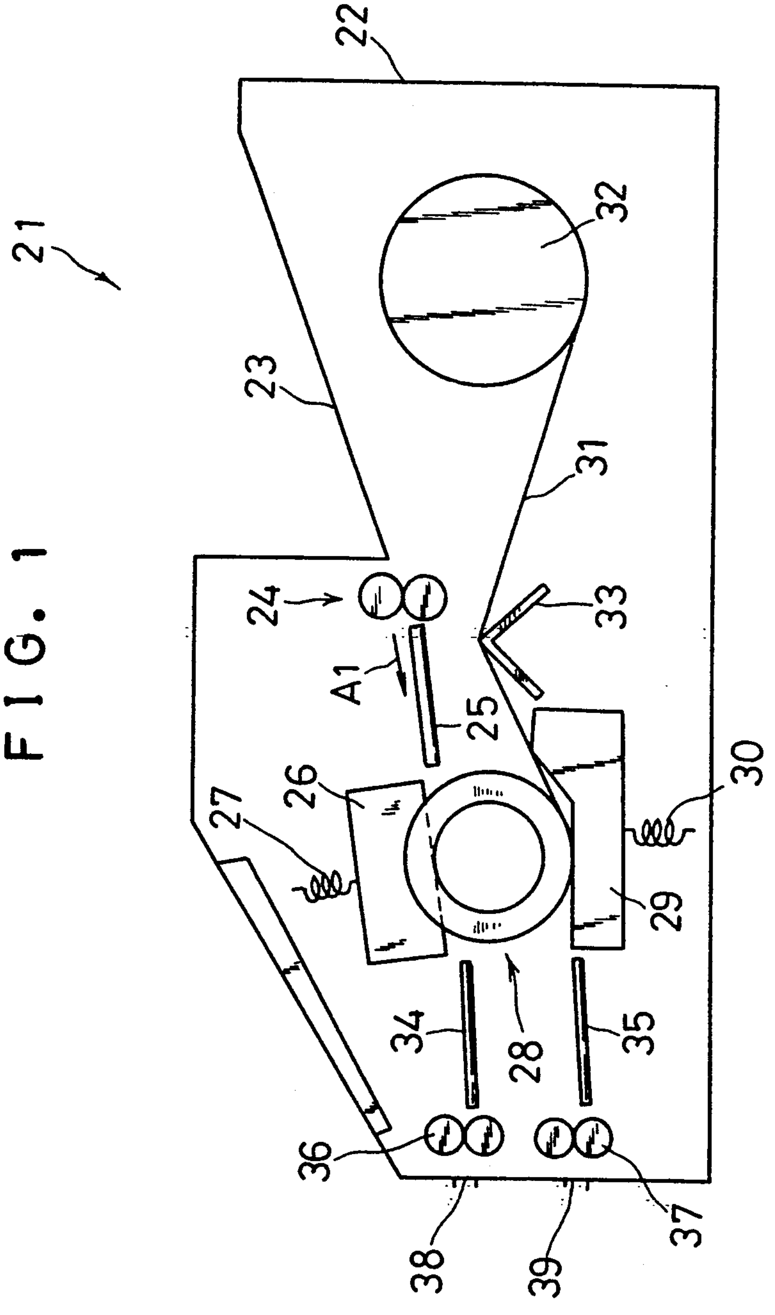
FIG. 1 is a diagram presented for explaining a structure of a facsimile 21 of an embodiment of the present invention.

FIG. 1 is a diagram presented for explaining a structure of a facsimile 21 in an embodiment according to the present invention. Original supply rollers 24 are placed within a body (side plates of the same) of the facsimile 21 to draw originals in an original tray 23, one after another, into the body. A guide member 25 and a reader 26 composed, for example, of a CCD (charge coupled device) and the like are disposed in the downstream part of the body array from the original supply rollers 24 with regard to a sheet feeding direction shown by an arrow A1.

A pushing device 27 such as a spring biases the reader 26 press against a roller 28. The reader 26 may include a plurality of rod lenses disposed in parallel to the axial line of the roller 28 and a line image sensor extending along the axial line of the roller 28, for reading the image of an original. On the other hand, a thermal head 29 is placed opposite to the reader 26 in relation to the roller 28 and intervening therebetween. A pushing means 30 such as a spring biases the thermal head 29 to press on the roller 28.

A body 22 houses a roll 32 of thermosensitive recording paper 31 used for the recording by the thermal head 29. The thermosensitive recording paper 31 drawn from the roll 32 is lead through the guide member 33 and passes between the thermal head 29 and the roller 28 for recording.

In the downstream part of the reader 26, roller 28 and thermal head 29, with regard to the paper feeding direction shown by the arrow A1, and guide members 34, 35 and rollers 36, 37 are disposed to discharge the used original and the thermosensitive recording paper 31 with a recording, from outlets 38, 39 to the outside of the body 22.

Figure 2:
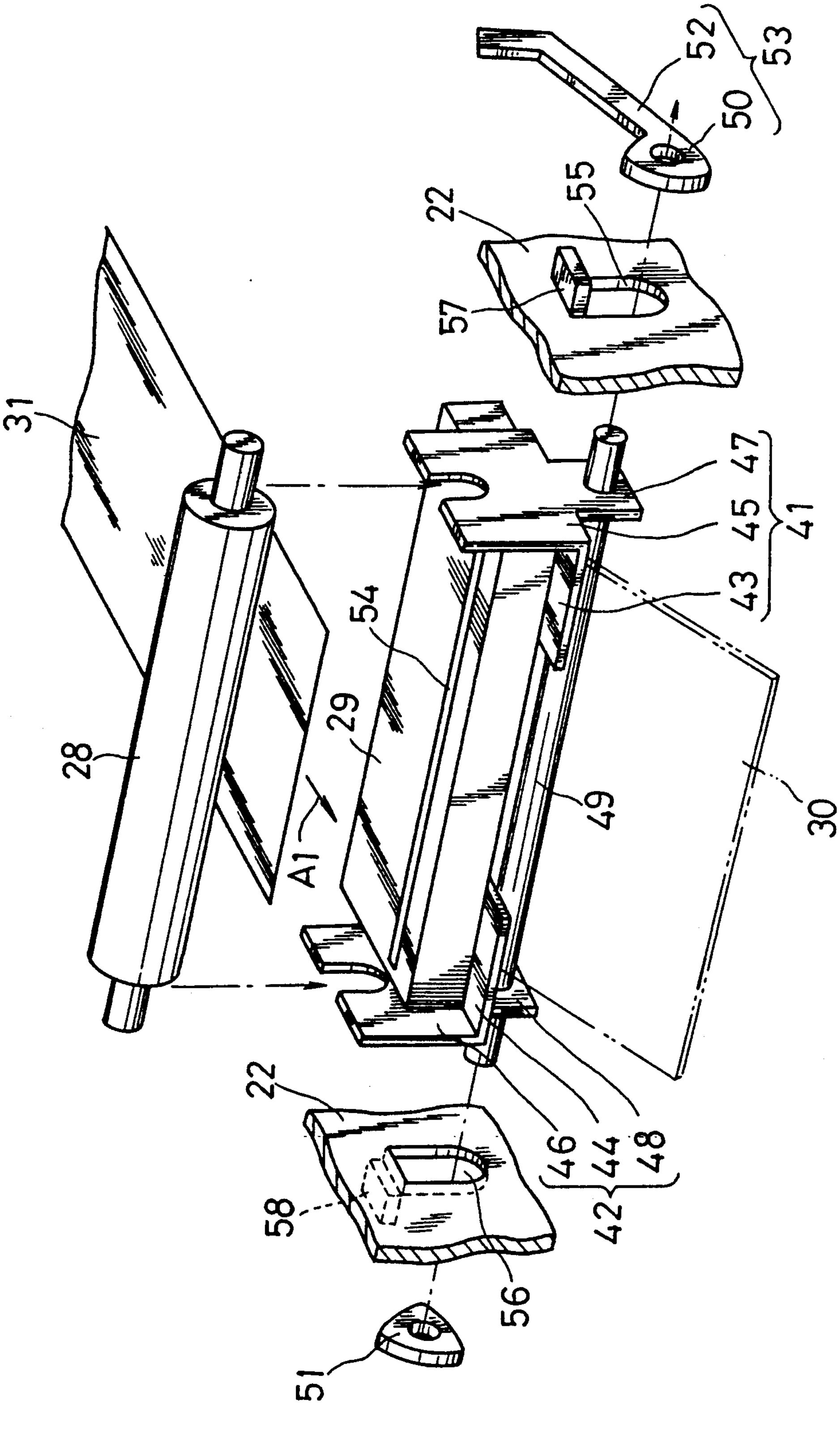
FIG. 2 is an exploded schematic view showing a structure related to a thermal head 29.

FIG. 2 is an exploded perspective view showing the relations among the body 22, roller 28 and thermal head 29. Opposite lateral ends of the thermal head 29 are fixed to receiving portions 43 44 of supporting portions 41, 42. The pushing device 30 such as a flat spring urges the thermal head 29 to press the thermosensitive recording paper 31 against on the roller 28. Vertical portions 45, 46 formed in the supporting portions 41, 42 hold the rotation shaft of the roller 28 therebetween to keep the thermal head 29 in position. The thermal head 29 includes a plurality of heating resistance elements 54 disposed in parallel to the line of the rotation shaft of the roller 28.

Portions 47, 48, which are formed in the supporting portions 41, 42 extending downward, hold a rotation shaft 49 therethrough. Opposite ends of the rotation shaft 49 protrude from elongate openings 55, 56 formed in the body 22, and cam members 50, 51 are fixed to the opposite ends of the rotation shaft 49. The cam member 50 is provided with an operating arm 52. A cam 53 is composed of these two components. Contact members 57, 58 are formed in the upper portion of the elongate openings 55, 56.

The roller 28 has a shape of a right circular cylinder, and is driven by a driving mechanism (not shown) such as a stepping motor, synchronously with the recording operation of the thermal head 29. This causes the thermosensitive recording paper 31 to move in the direction shown by the arrow A1.

Figure 3:
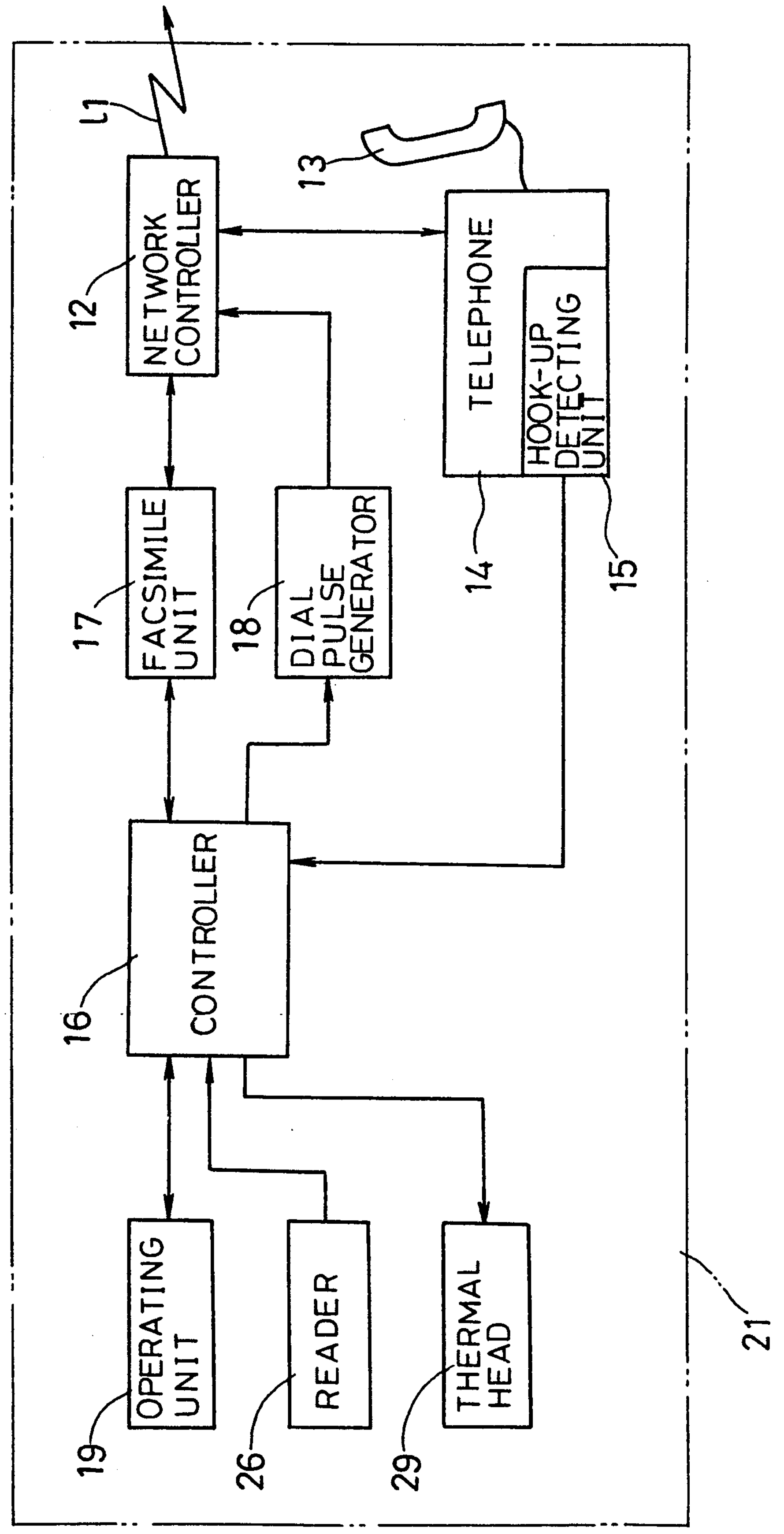
FIG. 3 is a block diagram showing an electric structure of the facsimile 21.

FIG. 3 is a block diagram showing an electric structure of the facsimile 21. The facsimile 21 has a network controller 12 connected to a telephone line 11. The network controller 12 controls line communication between the telephone line 11 and the facsimile 21. A telephone 14, which is provided with a handset 13 a telephone transmitter and receiver for telecommunication, is connected to the network controller 12. The telephone 14 is provided with a hook-up detecting unit 15 connected to a controller 16.

A facsimile unit 17 and a dial pulse generator 18 are provided between the controller 16 and the network controller 12. The facsimile unit 17 modulates or demodulates image data which the facsimile 21 transmits or receives through the telephone line 11. The dial pulse generator 18 generates dial signaling pulse according to a telephone number inputted from an operating unit 19 stated hereinafter.

The operating unit 19 including dial keys, a "start" key and the like, the reader 26 for optically reading the image of the original set in the facsimile 21, and the thermal head 29 for recording the image data received through the telephone line 11, is connected to the controller 16.

FIG. 4 is a diagram showing the facsimile 21 under a recording condition. Since the constitution related to the lateral opposite ends of the thermal head 29 is the same as in FIG. 2, an explanation about the cam member 50, which is provided with the operating arm 52, will be given. As shown in FIG. 4(1), the operating arm 52 is moved in the direction shown by an arrow 5R. The cam member 50 is then angularly displaced in the direction shown by the arrow R5. This causes a cam face 50a of the cam member 50 to keep off the contact member 57 as shown in FIG. 4(2), and the pushing device 30 then urges the thermal head 29 to press against the roller 28. The position where the thermal head 20 comes into contact with the roller 28 through the thermosensitive recording paper 31 exists on a plane P2 including the line corresponding to the rotation shaft of the roller 28 and the line corresponding to the rotation shaft of the cam member 50. The roller 28 is rotated under the condition to feed the thermosensitive recording paper 31 between the roller 28 and the thermal head 29, and the image data received is recorded on the thermosensitive recording paper 31.

Figure 5:
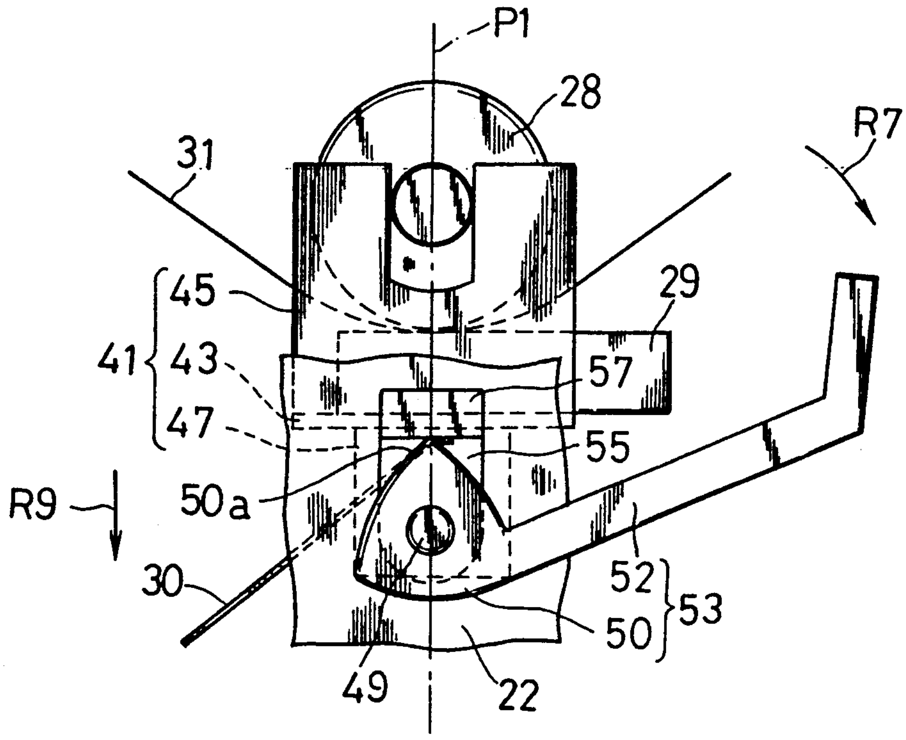
FIG. 5(1) is a side view showing a major portion of the facsimile 21 under the reception release condition.
Figure 5:
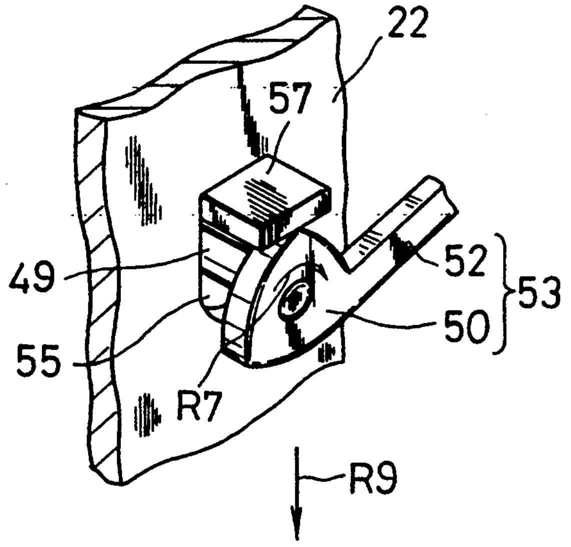
Figure 6:
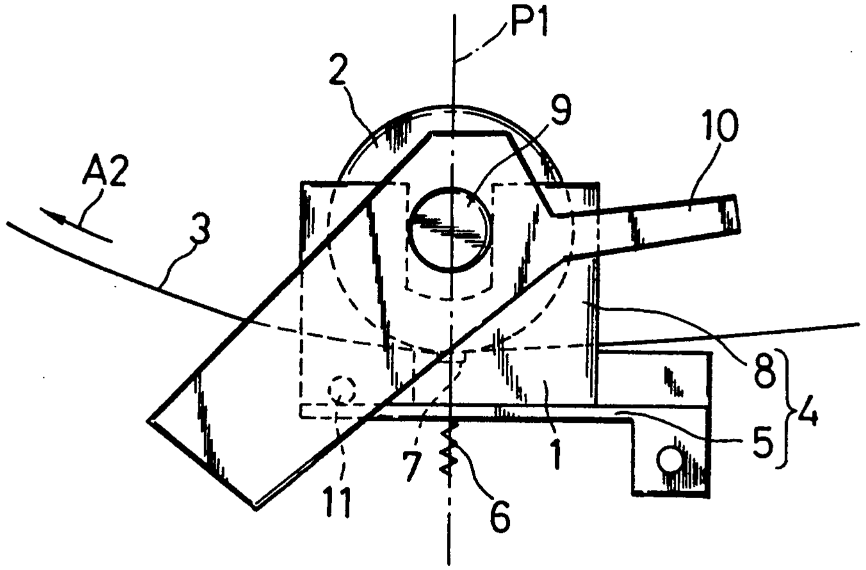
F I G. 6 (PRIOR ART)
FIG. 6 is a side view showing a major portion of a typical embodiment of a prior art facsimile under the recording condition.

FIG. 5 is a diagram showing the facsimile 21 under the condition where the thermal head 29 is kept off the roller 28, that is, the reception release condition. As shown in FIG. 5(1), the operating arm 52 is driven in the direction shown by an arrow R7. The cam member 50 is then angularly displaced in the direction of the arrow R7. This causes the cam face 50a of the cam member 50 to come into contact with the contact member 57 as shown in FIG. 5(2). and the rotation shaft 49 to which the cam member 50 is attached, the supporting portion 41 and the thermal head 29, are all displaced together against the force of the pushing device 30. They are displaced in the direction shown by an arrow R9 to keep the thermal head 29 at a distance from the roller 28 through the thermosensitive recording paper 31. At this time, the position where the cam face 50 comes in contact with the contact member 57 is on the plane P1.

As has been described, according to the present invention, the distortion of the thermal head 29 is prevented. Further, the thermal head 29 can be uniformly pressed against the roller in recording. This prevents the occurrence of an irregularity of the density in recording image data. Therefore, the high quality of data recording can be attained. Reduced force may be required for keeping the thermal head 29 off the roller 28 as compared to the conventional embodiment because the thermal head 29 is never distorted. Hence, the operability is improved.

According to the facsimile 21 of the present invention, no distortion is caused in the thermal head in keeping it off the roller. Thus, the thermal head can be uniformly pressed against the roller in recording. This prevents the occurrence of irregularity of the density in recording image data. Thus, the high quality of data recording can be attained. Additionally, reduced force may be required, for keeping the thermal head off the roller, and therefore is improved.

What is claimed is:

1. A thermal recording apparatus for recording information onto thermosensitive recording paper, comprising:

a body;

a roller, including a shaft, rotatably connected to said body, for transporting the thermosensitive recording paper in a first direction;

a thermal head within said body, capable of moving in a second direction perpendicular to said first direction and including a plurality of heating resistance elements;

said thermosensitive recording paper being transported between said plurality of heating resistance elements and said roller during said recording;

pushing means for biasing said thermal head to push said thermosensitive recording paper into contact with said roller during said recording;

a cam, operatively connected to said thermal head, capable of angularly displacing said thermal head, said cam including a cam face;

contact members connected to said body, contacting said face at a contact point during the angular displacing of said cam and displacing said thermal head a predetermined distance from said thermosensitive recording paper and said roller, opposing the biasing force of said pushing means, said plurality of heating resistance elements of said thermal head being positioned so as to be linearly arranged along a line including the shaft of said roller and the contact point.

2. The apparatus of claim 1, wherein said body includes side plates having elongate openings, a shaft sliding through said elongate openings to move in a radial direction of said roller, and a supporting member for supporting said shaft and said thermal head.

3. The apparatus of claim 1, wherein said cam includes a cam member having a cam face, and an operating arm extending from said cam member and capable of angularly displacing said cam portion in relation to said thermal head.

4. The apparatus of claim 1, wherein said pushing means is a flat spring.

5. The apparatus of claim 1, wherein the apparatus is used as a thermal printer for a facsimile device.

6. A thermal recording apparatus for recording information on thermosensitive paper comprising:

transporter means for transporting said thermosensitive paper during information recording;

recording means, connected to a support member and including a plurality of heating resistance elements, for recording information onto said thermosensitive paper;

pushing means, operatively connected to said recording means via a shaft further contacting said support member, for applying a biasing force to said recording means to contact said recording means to said thermosensitive paper, and subsequently contact said thermosensitive paper to said transporter means during information recording;

displacing means, connected to said shaft, rotating and subsequently contacting a contact member at a contact point and subsequently creating a force opposing said biasing force through said shaft, support member and subsequently said recording means to displace said recording means to predetermined distance from said transporting means, said contact point, shaft, and recording means being linearly aligned.

7. The apparatus of claim 6, wherein said displacing means comprises a first cam, said first cam including an operation arm for rotating in a plurality of directions, and a cam face, rotating with said operation arm and for subsequently contacting said contact member upon movement of said operation arm in a first of said plurality of directions.

8. The apparatus of claim 6, wherein, during information recording, said operation arm is moved in a second direction, different from said first direction, whereby said cam face does not contact said contact member at said contact point, during information recording.

9. The apparatus of claim 7, wherein said displacing means further includes a second cam, connected to said first cam through said shaft, said second cam contacting a second contact member at a second contact point upon movement of said operation arm in said first of said plurality of directions.

10. The apparatus of claim 9, wherein said first and second contact members are connected to a main body of said recording apparatus, said main body housing said transporter means, recording means and pushing means.

11. The apparatus of claim 6, wherein said thermal recording apparatus is utilized for recording information in a facsimile device.

12. The apparatus of claim 6, wherein said transporter means includes a roller.

13. The apparatus of claim 6, wherein said recording means includes a thermal head.

14. The apparatus of claim 6, wherein the pushing means includes a spring.

15. A displacing apparatus in a thermal recorder for displacing a thermal recording head a predetermined distance during non-recording of information onto a recording medium, the apparatus comprising:

a cam, including an operation ar movable in a plurality of directions and a cam face connected to said operation arm;

a shaft connected to said cam;

a support, connected to said shaft and further connected to and supporting a thermal recording head;

a contacting member, connected to a main body housing said thermal recorder, contacting said cam face at a contact point upon movement of said operational arm in a first of said plurality of directions, thereby creating a force through said shaft and support to displace said thermal recording head a predetermined distance;

said contact point, said shaft, and said thermal recording head all being linearly aligned.

16. The displacing apparatus of claim 51, wherein said force created to displace said thermal recording head is created to counteract an opposing force applied to maintain contact of said thermal recording head and the recording medium during information recording.

17. The displacing apparatus of claim 15, wherein said displacing apparatus is utilized in a facsimile apparatus.

18. The displacing device of claim 15, further comprising:

a second cam, including a second cam face connected to said shaft and opposing said first recited cam, said second cam contacting a second contacting member, attached to said main body at a second contact point, upon moving of said operational arm.

19. The displacing device of claim 18, wherein said first-recited cam face and said second cam face include at least one angled point, where two sides of each cam face intersect, each said at least one angled point creating a force through said shaft upon contacting said first and second contacting members respectively.

* * * * *